United States Patent
Yagi et al.

(10) Patent No.: US 8,847,543 B2
(45) Date of Patent: Sep. 30, 2014

(54) SECONDARY BATTERY CHARGING DEVICE AND SECONDARY BATTERY CHARGING SYSTEM

(75) Inventors: Shigeki Yagi, Chiba (JP); Hirokazu Serita, Chiba (JP); Mitsuharu Chiba, Chiba (JP); Hiroyuki Konishi, Chiba (JP); Akiko Asahata, Chiba (JP); Yasuyuki Kanai, Tokyo (JP); Takayuki Kanai, Tokyo (JP); Naoji Nomura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 432 days.

(21) Appl. No.: 13/371,904

(22) Filed: Feb. 13, 2012

(65) Prior Publication Data
US 2012/0206086 A1 Aug. 16, 2012

(30) Foreign Application Priority Data
Feb. 16, 2011 (JP) ................. 2011-031062

(51) Int. Cl.
H02J 7/00 (2006.01)
H01M 10/44 (2006.01)
H01M 10/46 (2006.01)
H01M 10/42 (2006.01)

(52) U.S. Cl.
CPC ........ H01M 10/465 (2013.01); *H01M 2220/30* (2013.01); *Y02E 60/12* (2013.01); H01M 10/44 (2013.01); H01J 7/0073 (2013.01); *H01M 10/425* (2013.01)
USPC .......................................... 320/101; 320/138

(58) Field of Classification Search
CPC ........................................................ H02J 7/35
USPC ....................... 320/101, 138, 139; 136/291
See application file for complete search history.

(56) References Cited

U.S. PATENT DOCUMENTS

| 4,394,611 | A | 7/1983 | Fallon et al. |
| 5,747,969 | A | 5/1998 | Tamai |
| 7,525,286 | B2 * | 4/2009 | Wang ............................ 320/133 |

(Continued)

FOREIGN PATENT DOCUMENTS

| JP | 06-038392 | 2/1994 |
| JP | 06-038392 A | 2/1994 |

(Continued)

OTHER PUBLICATIONS

Extended European Search Report for European Application No. 12155575.9, dated Jun. 6, 2012, 9 pages.

*Primary Examiner* — Yalkew Fantu
(74) *Attorney, Agent, or Firm* — Brinks Gilson & Lione (57) ABSTRACT

A secondary battery charging system includes a secondary battery charging device and a power generation device that generates a charging current. The secondary battery charging device controls the charging a secondary battery, which has a protection timer that counts a first elapsed time from a start of charging. The secondary battery charging device includes a charging switch that controls a supply of the charging current, a time management timer portion that counts a second elapsed time starting from a point at which the charging switch becomes conductive and performs a charging stop determination and that counts a third elapsed time starting from a point at which the charging switch is cut off and performs a charging start determination, and a charging control portion that causes the charging switch to be conductive or cut off based on results of the charging stop determination and the charging start determination.

9 Claims, 5 Drawing Sheets

(56) References Cited

U.S. PATENT DOCUMENTS

| | | | |
|---|---|---|---|
| 7,825,325 B2* | 11/2010 | Kennedy et al. | 136/244 |
| 2005/0189923 A1* | 9/2005 | Ohishi et al. | 320/138 |
| 2005/0266299 A1 | 12/2005 | Nishiyama et al. | |
| 2006/0108982 A1* | 5/2006 | Daou et al. | 320/116 |
| 2006/0255767 A1 | 11/2006 | Wong et al. | |
| 2009/0128086 A1* | 5/2009 | Lee | 320/101 |
| 2009/0133733 A1* | 5/2009 | Retti | 136/206 |

FOREIGN PATENT DOCUMENTS

| | | |
|---|---|---|
| JP | 07-123602 | 5/1995 |
| JP | 07-123602 A | 5/1995 |
| JP | 2004-166404 | 6/2004 |

* cited by examiner

| SECONDARY BATTERY TYPE | CHARGING DURATION TIME $t1$ | CHARGING INTERRUPTION TIME $t2$ |
|---|---|---|
| Type-1 | XXX | PPP |
| Type-2 | YYY | QQQ |
| Type-3 | ZZZ | RRR |
| ⋮ | ⋮ | ⋮ |

SECONDARY BATTERY CHARGING DEVICE AND SECONDARY BATTERY CHARGING SYSTEM

RELATED APPLICATIONS

This application claims priority under 35 U.S.C. §119 to Japanese Patent Application No. 2011-031062 filed on Feb. 16, 2011, the entire content of which is hereby incorporated by reference.

BACKGROUND OF THE INVENTION

1. Field of The Invention

The present invention relates to a secondary battery charging device that controls charging of a secondary battery and a secondary battery charging system that performs charging of the secondary battery.

2. Description of the Related Art

Mobile terminal devices, such as a personal digital assistant (PDA) and a mobile phone, can send and receive a large volume of information in a short time and they are used in many different fields.

Such a mobile terminal uses a secondary battery as its power source and it becomes necessary to charge the secondary battery when a charged amount falls below a pre-set value during use of the mobile terminal.

A charging device that charges the secondary battery by using natural energies, such as solar power generation and wind power generation, is widely known as a power generation source of electricity used for the above-mentioned charging (refer to JP-A-2004-166404, for example).

Further, in general, secondary batteries and electronic devices equipped with the secondary batteries have a protection timer, which is provided for the purpose of overcharge protection, and the protection timer performs a control in which charging is forcibly stopped when a pre-set charging time elapses.

Here, in some cases, a function of the protection timer is set off before the charged amount reaches a fully-charged amount, when an elapsed time of the protection timer exceeds the charging time.

Therefore, there is a charging method (refer to JP-A-7-123602, for example) that monitors a change in a charging current and re-sets the charging time of the protection timer when the charging time is prolonged due to decreased charging current.

Further, there is a charging method (refer to JP-A-6-38392, for example) that monitors a remaining capacity of the secondary battery and re-sets the charging time of the protection timer when the remaining capacity is less than the fully-charged charging amount.

SUMMARY OF THE INVENTION

However, when a structure disclosed in JP-A-2004-166404 is used, in which the secondary battery is charged by a charging current sourced from a charging power source generated by natural energies, an amount of current of the supplied charging current is lower in comparison with a case in which the secondary battery is charged by an alternating current (AC) from a commercial power source. Since the charging is performed by the lower charging current, it takes a long time for the secondary battery to be fully charged.

Therefore, in JP-A-7-123602 and JP-A-6-38392, when electricity used for charging is generated by natural energies as in JP-A-2004-166404, the charging takes time and there arises a situation in which a charging operation is stopped by a charging control before the secondary battery is fully charged because the protection timer function is set off in the secondary battery and the electronic device equipped with the secondary battery.

When the charging operation is stopped in this way, in order to restart the charging operation, it is necessary to once remove the charging device from the secondary battery and the electronic device equipped with the secondary battery and then to reconnect the charging device to the electronic device.

However, when the charging is stopped, a user, for example, needs to check a mark, which indicates the charging amount and which is displayed on the electronic device, in order to confirm whether the charging operation has been terminated because the battery is fully charged or whether the charging operation has been stopped by an operation of the protection timer.

Then, when it is confirmed that the charging has been stopped by the operation of the protection timer and not because the battery is fully charged, there arises a problem in which the user needs to go to the trouble of once removing the charging device from the electronic device and then reconnecting the charging device to the electronic device.

Further, as in JP-A-7-123602 and JP-A-6-38392, when the method is adopted in which the charging time of the protection timer is re-set based on the charging current or the remaining capacity of the secondary battery, there arises a problem in which the electronic device needs to be modified as the method requires a structure that re-sets the protection charging time in the secondary battery and the electronic device equipped with the secondary battery.

In light of the foregoing, it is an object of the present invention to provide a secondary battery charging device and a secondary battery charging system that are capable of charging a secondary battery until it is fully charged, without putting a burden on the user and with no need to add a structure for re-setting a charging time to an electronic device, even in a case in which a charging operation is stopped by an operation of a protection timer, such as when natural energies are used for power generation and it takes time to charge the secondary battery and so on.

A secondary battery charging system according to the present invention includes: a secondary battery charging device that charges the secondary battery and controls charging of a secondary battery, the secondary battery having a protection timer that counts a first elapsed time from a start of the charging and is pre-set a charging time, and a function to stop a charging operation when the first elapsed time exceeds the charging time; and a power generation device that generates a charging current as a charging power source of the secondary battery. The secondary battery charging device includes: a charging switch that performs a control of determining whether to supply the charging current from the power generation device to the secondary battery; a time management timer portion, in which are pre-set a stop time that is shorter than the charging time and a determination time required for the secondary battery to detect that the charging current from the power generation device is cut off, the time management timer portion counting a second elapsed time starting from a point at which the charging switch becomes conductive and performing a charging stop determination that determines whether the second elapsed time matches the stop time, and also counting a third elapsed time starting from a point at which the charging switch is cut off and performing a charging start determination that determines whether the third elapsed time matches the determination time; and a charging control portion that causes the charging switch to be conductive or cut off based on results of the charging stop determination and the charging start determination.

In the secondary battery charging system according to the present invention, the power generation device is one of a device that utilizes natural energies, including solar power generation that generates electric power by directly converting sunlight energy into electricity using a solar cell and the like, and wind power generation that generates electric power by receiving wind energy with a propeller and causing a rotor to rotate, and a device that uses a fuel cell for power generation.

In the secondary battery charging system according to the present invention, the time management timer portion outputs charging stop information to the charging control portion when the second elapsed time matches the stop time and outputs charging start information to the charging control portion when the third elapsed time matches the determination time. The charging control portion cuts off the charging switch based on the charging stop information and causes the charging switch to become conductive based on the charging start information.

In the secondary battery charging system according to the present invention, the stop time and the determination time of the time management timer portion are freely set.

In the secondary battery charging system according to the present invention, the time management timer portion internally has a setting table, in which are set combinations of the stop time and the determination time respectively corresponding to each of a type of the secondary battery. The time management timer portion sets the stop time and the determination time in correspondence to the type of the secondary battery to be charged, and uses the stop time and the determination time for the charging stop determination and the charging start determination.

A secondary battery charging device according to the present invention controls an electric current from a power generation device that generates a charging current as a charging power source of a secondary battery, the secondary battery having a protection timer that counts a first elapsed time from a start of charging and is pre-set a charging time, and a function to stop a charging operation when the first elapsed time exceeds the charging time. The secondary battery charging device includes: a charging switch that performs a control of determining whether to supply the charging current from the power generation device to the secondary battery; a time management timer portion, in which are pre-set a stop time that is shorter than the charging time and a determination time required for the secondary battery to detect that the charging current from the power generation device is cut off, the time management timer portion counting a second elapsed time starting from a point at which the charging switch becomes conductive and performing a charging stop determination that determines whether the second elapsed time matches the stop time and also counting a third elapsed time starting from a point at which the charging switch is cut off and performing a charging start determination that determines whether the third elapsed time matches the determination time; and a charging control portion that causes the charging switch to be conductive or cut off based on results of the charging stop determination and the charging start determination.

According to the present invention, a time management timer temporarily stops charging when a stop time elapses after the charging is started, the stop time being shorter than a charging time of a protection timer of a secondary battery. The time management timer makes it appear to the secondary battery that a charging device is removed, and starts the charging of the secondary battery again after a determination time elapses, the determination time corresponding to a time required for the secondary battery to become chargeable again after removing the charging device.

Therefore, according to the present invention, it is possible to perform the charging of the secondary battery until it is fully charged, without modifying the secondary battery or an electronic device that is equipped with the secondary battery, and even when an charging operation is stopped by an operation of the protection timer, it is not necessary for the user to remove the charging device from the secondary battery as in known art. In this way, it is possible to reduce a burden on the user when charging the secondary battery.

DETAILED DESCRIPTION OF THE PREFERRED EMBODIMENTS

Figure 1:
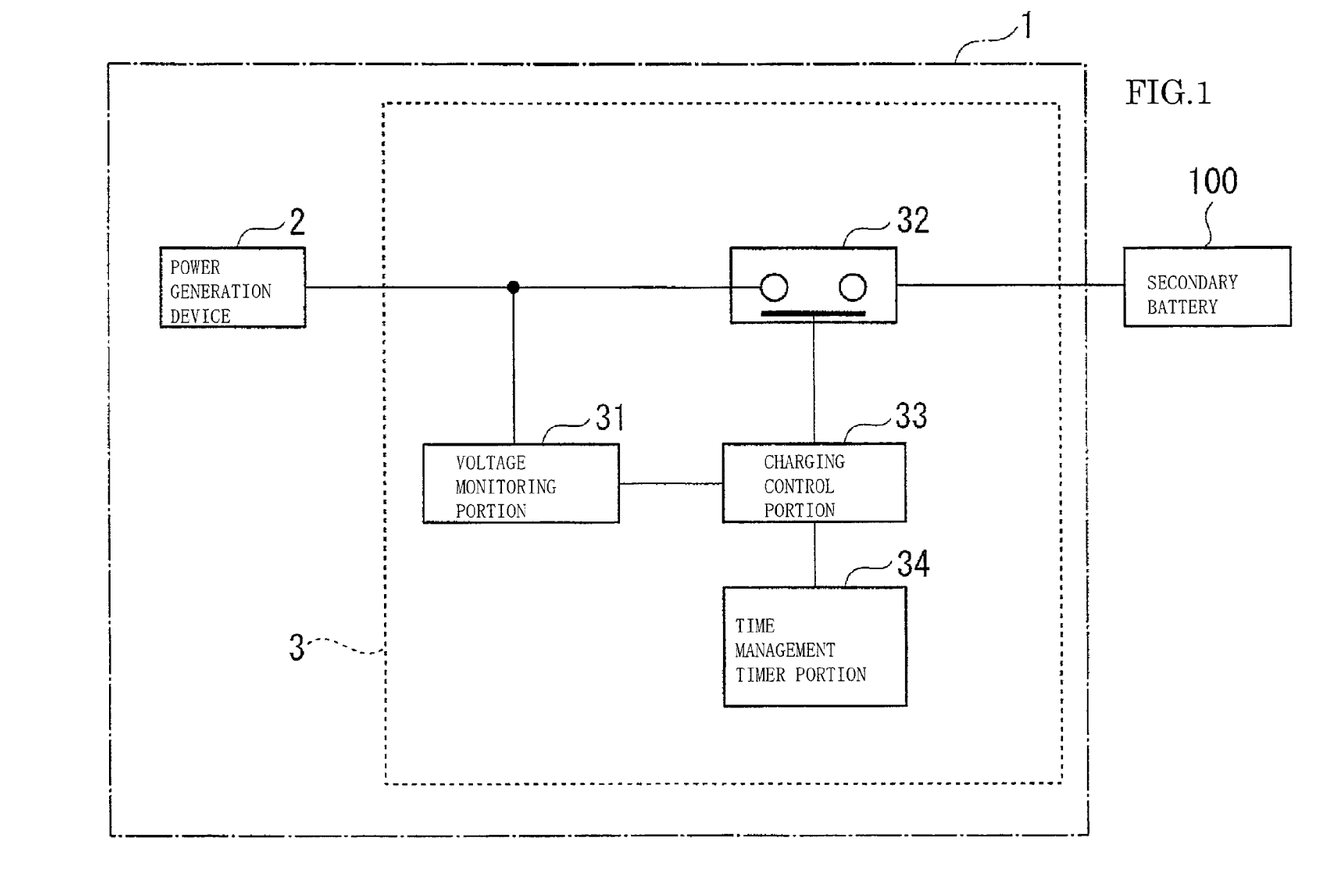
FIG. 1 is a block diagram showing a structural example of a secondary battery charging system that uses a secondary battery charging device according to an embodiment of the present invention.

Hereinafter, preferred embodiments of the present invention will be described in detail with reference to the appended drawings. FIG. 1 is a schematic block diagram showing a structural example of a secondary battery charging system using a secondary battery charging device according to an embodiment of the present invention.

In FIG. 1, a secondary battery charging system 1 includes a power generation device 2 and a secondary battery charging device 3 and performs charging of a secondary battery 100.

The secondary battery charging device 3 is driven by power generated by the power generation device 2 and the secondary battery charging device 3 includes a voltage monitoring portion 31, a charging switch 32, a charging control portion 33 and a time management timer portion 34.

The secondary battery 100 has a protection timer that counts an elapsed period of time from a start of charging. A predetermined charging time is set in the protection timer, and the protection timer counts the elapsed period of time from the start of the charging as a first elapsed time.

Further, the secondary battery 100 has a battery control portion (not shown in the figures) that stops a charging operation performed by the secondary battery charging device 3 with respect to the secondary battery 100.

The battery control portion stops the charging operation of the secondary battery 100 when the first elapsed time exceeds the charging time, the first elapsed time being counted by the protection timer. Further, after detecting that the secondary battery 100 has been removed from the secondary battery charging device 3, when the battery control portion detects that the secondary battery 100 is refitted to the secondary battery charging device 3 after a predetermined confirmation time elapses, the battery control portion restarts the charging.

The battery control portion counts the above-described time during which the secondary battery 100 is removed from the secondary battery charging device 3 as the confirmation time, using the protection timer.

The power generation device 2 is a power generation device that utilizes natural energies, such as solar power generation that generates power by directly converting sunlight energy into electricity using a solar cell and the like, and wind power generation that generates power by receiving wind energy with a propeller and thus causing a rotor to rotate.

Hence, with the power generation device 2, an amount of generated electric energy is affected by a surrounding natural environment, and it is likely that an amount of supplied electric energy becomes unstable since the amount of the generated electric energy fluctuates due to changes in the surrounding natural environment.

Note that the power generation device 2 may be a fuel cell that utilizes a chemical reaction. With the fuel cell, it is also likely that the amount of the generated electric power becomes unstable since the amount of the generated electric power fluctuates due to changes in reaction speed.

The voltage monitoring portion 31 is connected to an output terminal of the electric energy generated by the power generation device 2. The voltage monitoring portion 31 measures a terminal voltage of the output terminal of the power generation device 2 and monitors the measured terminal voltage.

More specifically, the voltage monitoring portion 31 makes a comparison between the detected terminal voltage and a no-load chargeable voltage V1 that is pre-set internally in the voltage monitoring portion 31, and when the terminal voltage is less than the no-load chargeable voltage V1, the voltage monitoring portion 31 determines that the secondary battery is connected to the secondary battery charging device 3, and when the terminal voltage is in excess of the no-load chargeable voltage V1, the voltage monitoring portion 31 determines that the secondary battery is not connected to the secondary battery charging device 3. Then, the voltage monitoring portion 31 outputs the determination result to the charging control portion 33 as connection information.

Further, the voltage monitoring portion 31 makes a comparison between the detected terminal voltage and a threshold charging voltage V2 that is pre-set internally in the voltage monitoring portion 31, and when the terminal voltage is less than the threshold charging voltage V2, the voltage monitoring portion 31 determines that the amount of the electric power generated by the power generation device 2 is not sufficient to charge the secondary battery, and when the terminal voltage is in excess of the threshold charging voltage V2, the voltage monitoring portion 31 determines that the amount of the electric power generated by the power generation device 2 is sufficient to charge the secondary battery. Then, the voltage monitoring portion 31 outputs the determination result to the charging control portion 33 as voltage information.

The charging switch 32 is a normally-off type (it is off, namely, in a cut-off state, when the secondary battery charging device 3 is not operating), and it is disposed such that it is inserted between the output terminal of the power generation device 2 and the secondary battery. The charging switch 32 controls a connection between the output terminal of the power generation device 2 and the secondary battery by changing its state between a conducting state and the cut-off state.

Here, when the charging switch 32 is in the conducting state, a state arises in which the charging current is supplied from the power generation device 2 to the secondary battery and charging processing is performed. On the other hand, when the charging switch 32 is in the cut-off state, a state arises in which the charging current is not supplied from the power generation device 2 to the secondary battery and the charging processing is stopped.

The time management timer portion 34 counts, as a second elapsed time, an elapsed period of time from a point at which the charging switch 32 becomes conductive (from a point at which 1 is set as a timer count flag Ft, which will be described below).

Then, when the second elapsed time matches a charging duration time t1 set by the charging control portion 33, the time management timer portion 34 outputs charging stop information to the charging control portion 33 as a result of a charging stop determination with respect to the secondary battery 100.

Further, the time management timer portion 34 counts, as a third elapsed time, an elapsed period of time from a point at which the charging switch 32 is cut off (from a point at which 0 is set as the timer count flag Ft, which will be described below).

Then, when the third elapsed time matches a charging interruption time t2 set by the charging control portion 33, the time management timer portion 34 outputs charging start information to the charging control portion 33 as a result of a charging start determination with respect to the secondary battery 100.

More specifically, the time management timer portion 34 outputs, to the charging control portion 33, a comparison result between the second elapsed time from the point at which the charging switch 32 becomes conductive and the charging duration time t1, and a comparison result between the third elapsed time from the point at which the charging switch 32 is cut off and the charging interruption time t2.

Here, according to the present embodiment, the time management timer portion 34 uses a subtraction counter and determines that there is a match when a count time T becomes 0 in the course of subtracting the count time T that is written in a setting register by the charging control portion 33 (described below).

In the charging control portion 33, the above-described charging duration time t1 is pre-set as a stop time that is shorter than a charging time of the secondary battery 100 and the charging interruption time t2 is pre-set as a determination time required for the secondary battery 100 to detect that the charging current from the secondary battery charging device 3 has been cut off. The determination time is set to be a shorter time than the charging time set in the secondary battery 100.

Further, via the control of the voltage monitoring portion 31 and the time management timer portion 34 (described below), the charging control portion 33 controls the charging switch 32 by changing its state between the conducting (ON) state and the cut-off (OFF) state.

More specifically, the charging control portion 33 performs a control of changing the conducting state to the cut-off state by switching off the charging switch 32, when the charging control portion 33 is supplied by the time management timer portion 34 with the charging stop information that is a result of the charging stop determination with respect to whether or not the second elapsed time is in excess of the charging duration time t1.

Further, the charging control portion 33 performs a control of changing the cut-off state to the conducting state by switching on the charging switch 32, when the charging control portion 33 is supplied by the time management timer portion 34 with the charging start information that is a result of the charging start determination with respect to whether or not the third elapsed time is in excess of the charging interruption time t2.

In addition, the charging control portion 33 performs a control of changing the state of the charging switch 32 between the conducting state and the cut-off state based on the connection information and the voltage information provided by the voltage monitoring portion 31.

More specifically, when the connection information indicates that the secondary battery charging device 3 and the secondary battery 100 are not connected to each other (a non-connected state), the charging control portion 33 performs the control of switching off the charging switch 32 and switching it to the cut-off state.

Further, when the voltage information indicates that the amount of the generated electric power is not sufficient to charge the secondary battery, the charging control portion 33 performs the control of switching off the charging switch 32 and switching it to the cut-off state, in order to stop a charging control operation in the charging control portion of the secondary battery 100 etc.

In this way, the charging control portion 33 performs the control of determining whether or not the charging current should be supplied from the power generation device 2 to the secondary battery 100.

Figure 2:
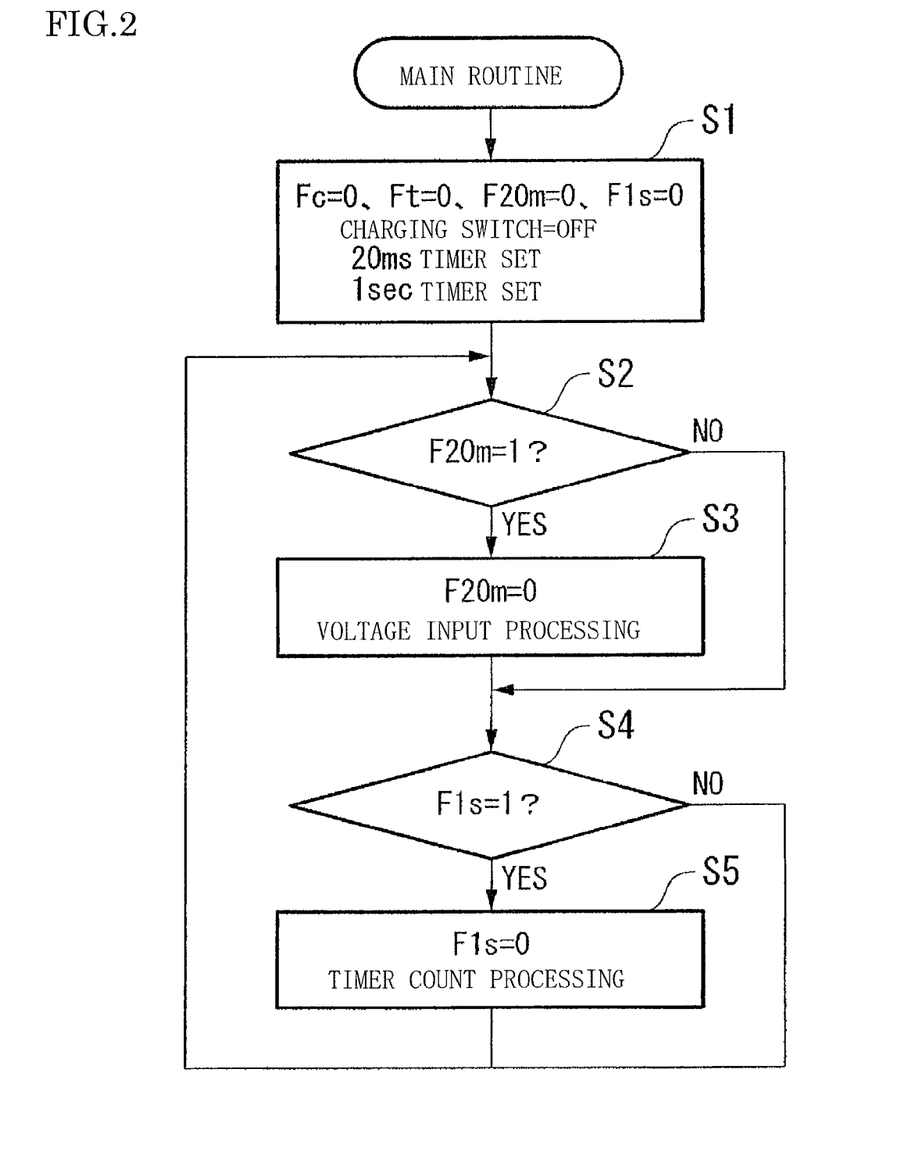
FIG. 2 is a flowchart showing a main routine in a charging operation of a secondary battery charging device 3.
Figure 3:
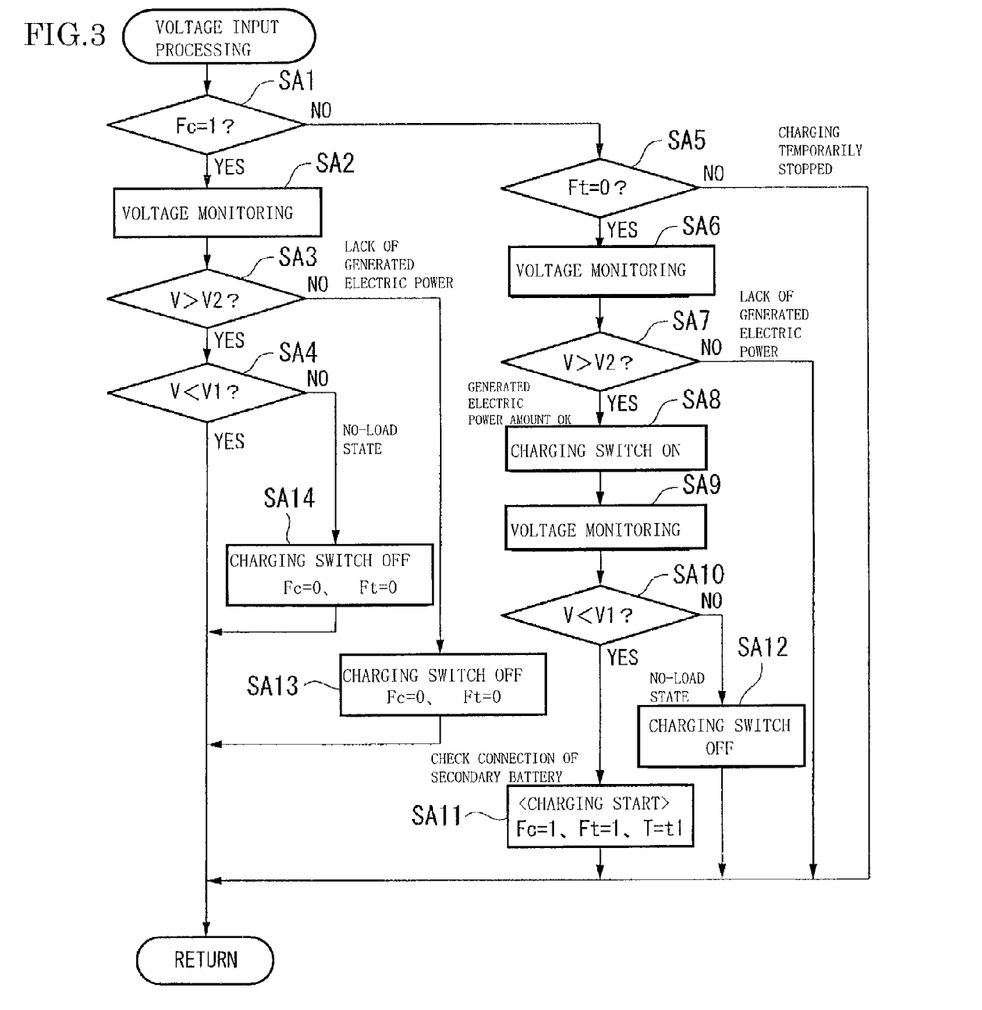
FIG. 3 is a flowchart showing operations of voltage input processing by the secondary battery charging device 3.
Figure 4:
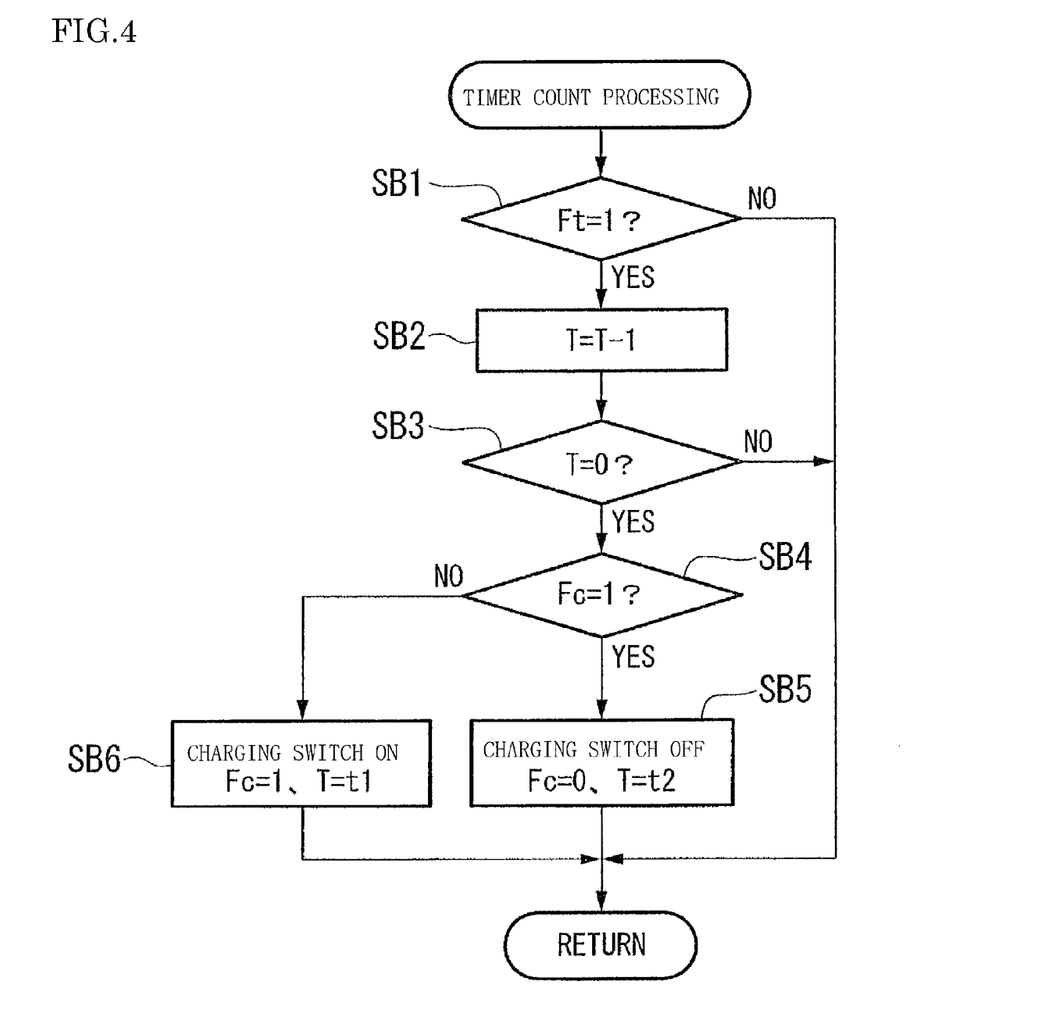
FIG. 4 is a flowchart showing operations of timer count processing by the secondary battery charging device 3.

Next, with reference to FIG. 2, FIG. 3 and FIG. 4, operations of the secondary battery charging device 3 according to the present embodiment will be described. FIG. 2 is a flowchart showing a main routine in a charging operation of the secondary battery charging device 3. FIG. 3 is a flowchart showing operations of voltage input processing by the secondary battery charging device 3. FIG. 4 is a flowchart showing operations of timer count processing by the secondary battery charging device 3.

[Main Routine]

A main routine processing shown in FIG. 2 will be described below.

Step S1:

When the secondary battery charging device 3 is connected to the power generation device 2, the charging control portion 33 is started up by electric power output by the power generation device 2.

Then, the charging control portion 33 sets (re-sets) 0 as the timer count flag Ft that is internally provided in the charging control portion 33. 0 indicates that the time management timer portion 34 is not performing a counting operation. At the same time, the charging control portion 33 sets 0 as a charging state flag Fc that is internally provided in the charging control portion 33 in a similar manner to the timer count flag Ft. Here 0 indicates a state in which charging is not being performed. Here, the timer count flag Ft indicates whether or not the time management timer portion 34 is performing the counting operation. When 0 is set as the timer count flag Ft, this indicates that the time management timer portion 34 is not performing the counting operation. On the other hand, when 1 is set as the timer count flag Ft, this indicates that the time management timer portion 34 is performing the counting operation. In a similar manner, the charging state flag Fc indicates whether or not the secondary battery charging device 3 is performing charging processing with respect to the secondary battery 100. When 0 is set as the charging state flag Fc, this indicates that the charging processing is not being performed with respect to the secondary battery 100. On the other hand, when 1 is set as the charging state flag Fc, this indicates that the charging processing is being performed with respect to the secondary battery 100.

At this time, the charging control portion 33 switches off the charging switch 32 and switches it to the cut-off state.

Further, the charging control portion 33 is internally provided with a 20 millisecond (ms) timer and a 1 second (s) timer. Here, the 20 ms timer counts a cycle of performing detection of a terminal voltage of the power generation device 2. The 1 s timer counts a cycle of performing timer processing.

Then, the charging control portion 33 re-sets an overflow monitoring flag F20$m$ (F20$m$=0) that indicates a count-up of the 20 ms timer, and also re-sets an overflow monitoring flag F1$s$ (F1$s$=0) that indicates a count-up of the 1 s timer.

Next, the charging control portion 33 causes the 20 ms timer and the 1 s timer to start the respective counting operations.

The above-described 20 ms timer sets the overflow monitoring flag F20$m$ (F20$m$=1), when 20 ms elapses from when the counting operation is started.

In a similar manner, the 1 s timer sets the overflow monitoring flag F1$s$ (F1$s$=1), when 1 s elapses from when the counting operation is started.

Step S2:

The charging control portion 33 determines whether or not a time counted by the 20 ms timer has reached 20 ms based on whether or not the overflow monitoring flag F20$m$ is 1.

Then, when the 20 ms timer has counted 20 ms and the overflow monitoring flag F20$m$ is set to 1, the charging control portion 33 determines that 20 ms has elapsed and advances the processing to step S3.

On the other hand, when the 20 ms timer has not yet counted 20 ms and the overflow monitoring flag F20$m$ remains at 0, the charging control portion 33 determines that 20 ms has not yet elapsed and advances the processing to step S4.

Step S3:

The charging control portion 33 re-sets the counted-up overflow monitoring flag F20$m$ of the 20 ms timer to 0 (F20$m$=0).

Then, the charging control portion 33 starts the counting operation of the 20 ms timer and also executes a voltage input processing routine (a flowchart in FIG. 3), which will be described below.

Step S4:

The charging control portion 33 determines whether or not a time counted by the 1 s timer has reached 1 s based on whether or not the overflow monitoring flag F1$s$ is 1.

Then, when the 1 s timer has counted 1 s and the overflow monitoring flag F1$s$ is set to 1, the charging control portion 33 determines that 1 s has elapsed and advances the processing to step S5.

On the other hand, when the 1 s timer has not yet counted 1 s and the overflow monitoring flag F1$s$ remains at 0, the charging control portion 33 determines that 1 s has not yet elapsed and advances the processing to step S2.

Step S5:

The charging control portion 33 re-sets the counted-up overflow monitoring flag F1$s$ of the 1 s timer to 0 (F1$s$=0).

Then, the charging control portion 33 starts the counting operation of the 1 s timer and also executes a timer count processing routine (a flowchart in FIG. 4), which will be described below.

[Voltage Input Processing Routine]

Step SA1:

The charging control portion 33 performs detection of whether or not 1 is set as the charging state flag Fc.

Then, when the charging state flag Fc is set to 1, the charging control portion 33 advances the processing to step SA2.

On the other hand, when the charging state flag Fc is not set to 1, namely, when the charging state flag Fc is set to 0, the charging control portion 33 advances the processing to step SA5.

Step SA2:

The voltage monitoring portion 31 detects a terminal voltage V of the output terminal of the power generation device 2. More specifically, the voltage monitoring portion 31 performs measurement of the terminal voltage.

Step SA3:

The voltage monitoring portion 31 compares the measured terminal voltage V with a lower threshold voltage required for a pre-set voltage generated by the power generation device 2 to operate the secondary battery charging device 3, namely, with the threshold charging voltage V2 that is an amount of the generated electric power necessary to perform the charging.

At this time, when the terminal voltage V is in excess of the threshold charging voltage V2, the voltage monitoring portion 31 outputs, to the charging control portion 33, the voltage information indicating that the amount of electric power generated by the power generation device 2 is a sufficient amount to charge the secondary battery 100, and then advances the processing to step SA4.

On the other hand, when the terminal voltage V is less than or equal to the threshold charging voltage V2, the voltage monitoring portion 31 outputs, to the charging control portion 33, the voltage information indicating that the amount of electric power generated by the power generation device 2 is an insufficient amount to charge the secondary battery 100, and then advances the processing to step SA13.

Step SA4

The voltage monitoring portion 31 compares the measured terminal voltage V with a pre-set open circuit voltage of a time when the secondary battery 100 is not connected to the secondary battery charging device 3, namely, with the no-load chargeable voltage V1, which is a voltage indicating that the output terminal of the power generation device 2 has no load.

At this time, when the terminal voltage V is less than the no-load chargeable voltage V1, the voltage monitoring portion 31 outputs, to the charging control portion 33, the connection information indicating that the secondary battery 100 is connected to the secondary battery charging device 3, and then advances the processing to step S4 of the main routine.

On the other hand, when the terminal voltage V is larger than or equal to the no-load chargeable voltage V1, the voltage monitoring portion 31 outputs, to the charging control portion 33, the connection information indicating that the secondary battery 100 is not connected to the secondary battery charging device 3, and then advances the processing to step SA14.

Step SA5:

The charging control portion 33 determines whether or not 0 is set as the timer count flag Ft. When 0 is set as the timer count flag Ft, the counting operation of neither the second elapsed time nor the third elapsed time is being performed in the time management timer portion 34. On the other hand, when 1 is set as the timer count flag Ft, the counting operation of either the second elapsed time or the third elapsed time is being performed in the time management timer portion 34.

Then, when 0 is set as the timer count flag Ft (when the charging of the secondary battery 100 has not been started), the charging control portion 33 advances the processing to step SA6.

On the other hand, when 0 is not set as the timer count flag Ft (when the charging of the secondary battery 100 is temporarily stopped), namely, when 1 is set as the timer count flag Ft, the charging control portion 33 advances the processing to step S4 of the main routine.

Step SA6:

The voltage monitoring portion 31 detects the terminal voltage V of the output terminal of the power generation device 2. More specifically, the voltage monitoring portion 31 performs measurement of the terminal voltage.

Then, the voltage monitoring portion 31 advances the processing to step SA7.

Step SA7:

The voltage monitoring portion 31 compares the measured terminal voltage V with the pre-set threshold charging voltage V2.

At this time, when the terminal voltage V is in excess of the threshold charging voltage V2, the voltage monitoring portion 31 advances the processing to step SA8 after outputting, to the charging control portion 33, the voltage information indicating that the amount of the electric power generated by the power generation device 2 is the sufficient amount to charge the secondary battery 100.

On the other hand, when the terminal voltage V is less than or equal to the threshold charging voltage V2, the voltage monitoring portion 31 advances the processing to step S4 of the main routine after outputting, to the charging control portion 33, the voltage information indicating that the amount of the electric power generated by the power generation device 2 is the insufficient amount to charge the secondary battery 100.

Step SA8:

When the voltage information indicating that the amount of the generated electric power is sufficient is provided to the charging control portion 33 by the voltage monitoring portion 31, the charging control portion 33 switches on the charging switch 32 and switches it to the conducting state.

By this, the secondary battery charging device 3 starts the charging of the secondary battery 100 and advances the processing to step SA9.

Step SA9:

The voltage monitoring portion 31 detects the terminal voltage V of the output terminal of the power generation device 2. More specifically, the voltage monitoring portion 31 performs measurement of the terminal voltage and advances the processing to step SA10.

Step SA10:

The voltage monitoring portion 31 compares the measured terminal voltage V with the pre-set no-load chargeable voltage V1.

At this time, when the measured terminal voltage V is less than the no-load chargeable voltage V1, the voltage monitoring portion 31 advances the processing to step SA11 after outputting, to the charging control portion 33, the connection information indicating that the secondary battery 100 is connected to the secondary battery charging device 3.

On the other hand, when the terminal voltage V is larger than or equal to the no-load chargeable voltage V1, the voltage monitoring portion 31 advances the processing to step SA12 after outputting, to the charging control portion 33, the connection information indicating that the secondary battery 100 is not connected to the secondary battery charging device 3.

Step SA11:

When the connection information indicating that the secondary battery 100 is connected to the secondary battery charging device 3 is supplied to the charging control portion 33 by the voltage monitoring portion 31, the charging control portion 33 sets a flag described below as processing to start the charging.

More specifically, as the charging has been started, the charging control portion 33 sets 1 as the charging state flag Fc. Namely, in step SA8, the charging control portion 33 switches the charging switch 32 to the ON state and 1 is set as the charging state flag Fc, because the secondary battery charging device 3 has started the charging of the secondary battery 100.

Further, the charging control portion 33 re-sets a count of the time management timer portion 34 and causes the time management timer portion 34 to start counting the second elapsed time. For example, the time management timer portion 34 manages the time using the subtraction counter that performs the subtraction counting.

More specifically, the charging control portion 33 writes in a value of the charging duration time t1 as the count time T with respect to the setting register of the time management timer portion 34 and causes the subtraction counting to be started. Here, the charging duration time t1 is a natural number in units of seconds.

Further, the charging control portion 33 sets 1 as the timer count flag Ft to cause the time management timer portion 34 to start the counting processing.

Then, the charging control portion 33 advances the processing to step S4 of the main routine.

Step SA12:

When the connection information indicating that the secondary battery 100 is not connected to the secondary battery charging device 3 is supplied to the charging control portion 33 by the voltage monitoring portion 31, the charging control portion 33 advances the processing to step S4 of the main routine. At this time, the secondary battery charging device 3 switches the charging switch 32 to the OFF state, namely, the cut-off state, and does not start the charging processing with respect to the secondary battery 100.

Note that, without switching off the charging switch 32 at step SA12, starting from step SA9 in the next voltage input processing, the secondary battery charging device 3 may stand by while keeping the charging switch 32 in the ON state until the connection state with the secondary battery 100 is obtained.

Step SA13:

When the voltage information indicating that the amount of the generated electric power is insufficient is supplied to the charging control portion 33 by the voltage monitoring portion 31, the charging control portion 33 switches off the charging switch 32 and switches it to the cut-off state.

Further, as the charging is stopped, the charging control portion 33 sets 0 as the charging state flag Fc and also sets 0 as the timer count flag Ft, thus causing the time management timer portion 34 to stop the counting operation.

Then, the charging control portion 33 advances the processing to step S4 of the main routine.

By this, the secondary battery charging device 3 stops the charging of the secondary battery 100.

Note that when a terminal voltage V is less than the threshold charging voltage V2, in some cases, a system of the charging control portion 33 itself may stop the operation due to a lack of electric power. At this time, the operation of the charging control portion 33 stops before reaching step SA13 and the charging of the secondary battery is not performed due to the lack of electric power. In this case, step SA13 may be skipped. Further, under such a condition, after the operation of the charging control portion 33 stops, when power generation is recovered, the processing starts again from step S1 of the main routine.

Step SA14:

When the connection information indicating that the secondary battery 100 is not connected to the secondary battery charging device 3 is supplied to the charging control portion 33 by the voltage monitoring portion 31, the charging control portion 33 switches off the charging switch 32 and switches it to the cut-off state.

Further, as the charging is stopped, the charging control portion 33 sets 0 as the charging state flag Fc and also sets 0 as the timer count flag Ft, thus causing the time management timer portion 34 to stop the counting operation.

Then, the charging control portion 33 advances the processing to step S4 of the main routine.

By this, the secondary battery charging device 3 stops the charging of the secondary battery 100.

Note that, without switching off the charging switch 32 at step SA14, starting from step SA2 in the next voltage input processing, the secondary battery charging device 3 may stand by while keeping the charging switch 32 in the ON state until the connection state with the secondary battery 100 is obtained.

[Timer Count Processing Routine]

Step SB1

The time management timer portion 34 determines whether or not 1 is set as the timer count flag Ft of the charging control portion 33.

At this time, when 1 is set as the timer count flag Ft of the charging control portion 33, the time management timer portion 34 advances the processing to step SB2.

On the other hand, when 1 is not set as the timer count flag Ft of the charging control portion 33, namely, when 0 is set as the timer count flag Ft of the charging control portion 33, the time management timer portion 34 advances the processing to step S2 of the main routine.

Step SB2:

The time management timer portion 34 reads out the count time T of the setting register and subtracts (decrements) 1 from the read-out count time T. Then, the time management timer portion 34 writes the subtraction result in the setting register as a new count time T, the subtraction result being the count time T−1.

Then, the time management timer portion 34 advances the processing to step SB3.

Step SB3:

Next, the time management timer portion 34 reads out the count time T of the setting register and determines whether or not the read-out count time T is 0.

At this time, when the read-out count time T is 0, the time management timer portion 34 advances the processing to step SB4 after outputting a count result to the charging control portion 33.

Here, the count result is the charging stop information when the count time T is counted as the second elapsed time, and the count time is the charging start information when the count time T is counted as the third elapsed time.

On the other hand, when the count time is not 0, namely, when it is 1 or more, the time management timer portion 34 advances the processing to step S2 of the main routine.

Step SB4:

Next, when either the charging stop information or the charging start information is supplied to the charging control portion 33 by the time management timer portion 34, the charging control portion 33 determines whether or not 1 is set as the charging state flag Fc.

At this time, when 1 is set as the charging state flag Fc, the charging control portion 33 advances the processing to step SB5. On the other hand, when 1 is not set as the charging state flag Fc, namely, when 0 is set as the charging state flag Fc, the charging control portion 33 advances the processing to step SB6.

Step SB5:

Given that a current state is a charging state, the charging control portion 33 switches off the charging switch 32 and switches it to the cut-off state in which the charging current is not supplied to the secondary battery 100.

Then, as the charging control portion 33 switches off the charging switch 32 and cuts off the charging current such that it is not supplied to the secondary battery 100, the charging control portion 33 sets 0 as the charging state flag Fc and turns an operational state into a charging stop state.

Further, in order to cause the time management timer portion 34 to count the third elapsed time starting at a point at which the charging stop state is obtained, the charging control portion 33 writes the charging interruption time t2 in the set register of the time management timer portion 34 as the count time T.

By this, since 1 is set as the timer count flag Ft, the time management timer portion 34 starts counting the third elapsed time.

Then, the charging control portion 33 advances the processing to step S2 of the main routine.

Step SB6:

Given that the current state is a non-charging state, the charging control portion 33 switches on the charging switch 32 and switches it to the conducting state in which the charging current is supplied to the secondary battery 100.

Then, since the charging control portion 33 switches on the charging switch 32 and causes the charging current to be supplied to the secondary battery 100, the charging control portion 33 sets 1 as the charging state flag Fc and switches the operational state to the charging state.

Further, in order to cause the time management timer portion 34 to count the second elapsed time starting at a point at which the charging state is obtained, the charging control portion 33 writes the charging duration time t1 in the set register of the time management timer portion 34 as the count time T.

By this, since 1 is set to the timer count flag Ft, the time management timer portion 34 starts counting the second elapsed time.

Then, the charging control portion 33 advances the processing to step S2 of the main routine.

According to the present embodiment, with the above-described structure, the secondary battery charging device 3 temporarily stops the charging at a point at which the charging duration time t1 elapses, before the battery control portion of the secondary battery stops the charging triggered by the charging time counted by the protection timer, and restarts the charging operation when the charging interruption time t2 elapses, which is a time for the battery control portion of the secondary battery to become able to perform the charging again.

Therefore, according to the present embodiment, when the charging is stopped by the protection timer function of the secondary battery, unlike in known art, it is not necessary for the user to continue the charging by removing the secondary battery from the secondary battery charging device once and fitting the secondary battery to the secondary battery charging device again.

More specifically, when the charging time is very long, as in a power generation device using natural energies, it is possible for the user to let the secondary battery charging device perform the charging without worrying about the protection timer function of the secondary battery.

Figure 5:
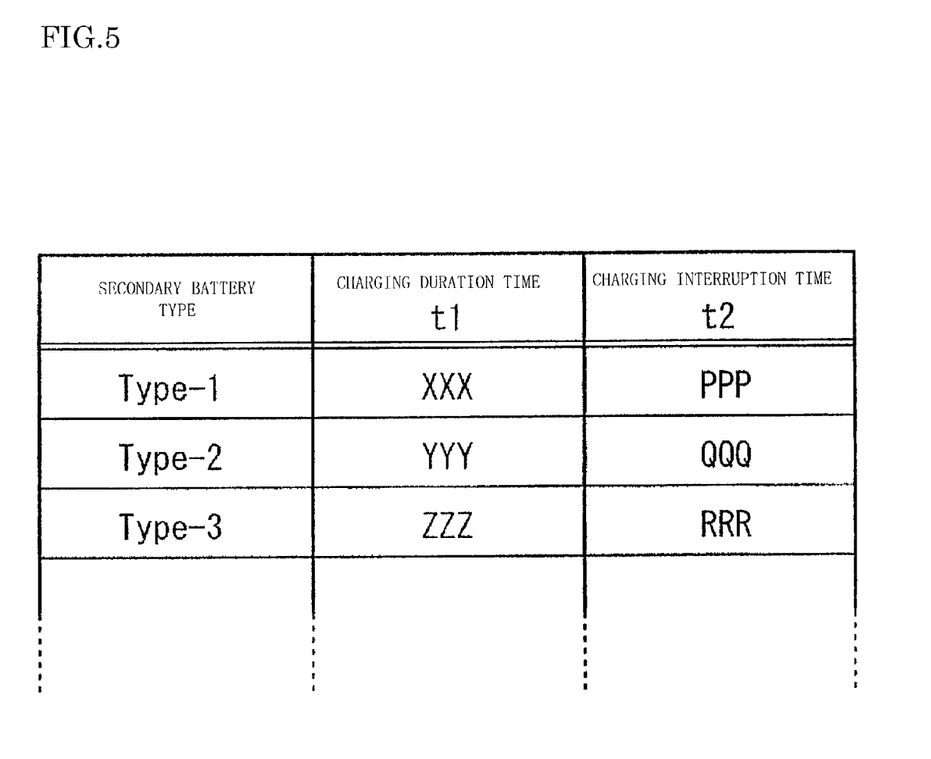
FIG. 5 is a diagram of a table structure showing correspondence relationships between a type of the secondary battery and a charging duration time t1 and a charging interruption time t2 respectively corresponding to the type of the secondary battery, the table being stored in an internal storage portion of a charging control portion 33.

Further, the charging control portion 33 stores as a table, in an internal storage portion, correspondence relationships between a type of the secondary battery and the charging duration time t1 and the charging interruption time t2 respectively corresponding to the type of the secondary battery.

FIG. 5 is a diagram of a table structure showing the correspondence relationships between the type of the secondary battery and the charging duration time t1 and the charging interruption time t2 respectively corresponding to the type of the secondary battery. The table of correspondence relationships is stored in the internal storage portion of the charging control portion 33.

When the user selects the type of the secondary battery using an input portion (not shown in the figures) of the secondary battery charging device 3 such as a switch, for example, the charging control portion 33 detects the type of the secondary battery based on the switch set by the user.

Then, the charging control portion 33 reads out, from the above-described table in the internal storage portion, the charging duration time t1 and the charging interruption time t2 corresponding to the detected type of the secondary battery and uses the read out times as the above-described count time T that is set in the setting register of the time management timer portion 34.

In this way, according to the present embodiment, the secondary battery charging device can correspond to a plurality of types of the secondary battery and can perform the charging processing with respect to the plurality of types of the secondary battery.

Further, the charging control with respect to the secondary battery may be managed by storing in a storage medium readable by a computer a program for performing respective functions of the voltage monitoring portion 31, the charging control portion 33 and the time management timer portion 34 shown in FIG. 1 and by causing a computer system to read and perform the program stored in the storage medium. Note that the "computer system" mentioned here includes hardware such as an operating system and a peripheral device.

Further, when the "computer system" uses a WWW system, it includes an environment for providing (or displaying) a homepage.

Further, the "storage medium readable by the computer" includes portable media, such as a flexible disk, a magneto-optical disk, a read-only memory (ROM) and a compact disk read-only memory (CD-ROM), and storage devices built in the computer system such as a hard disk. Further, the "storage medium readable by the computer" also includes a device that dynamically stores the program for a short period of time, such as a communication line used in a case in which the program is sent using a network like the Internet etc. or a communication circuit like a telephone circuit, and a device that stores the program for a certain time in the above-described case, such as a volatile memory installed inside the computer system that functions as a server or a client. In addition, the above-described program may be a program that is designed to execute some of the above-described functions or may also be a program that can execute the above-described functions in combination with a program that already stores the above-described functions in the computer system.

Although the embodiment of the present invention has been described in detail above in reference to the appended drawings, specific structures are not limited to the embodiment described herein and it should be understood by those skilled in the art that various designs etc. are included insofar as they are within the scope of the appended claims or the equivalents thereof.

What is claimed is:

1. A secondary battery charging system, comprising:
a secondary battery charging device that charges a secondary battery and controls charging of the secondary battery, the secondary battery having a protection timer that counts a first elapsed time from a start of the charging and is pre-set a charging time, and a function to stop a charging operation when the first elapsed time exceeds the charging time; and
a power generation device that generates a charging current as a charging power source of the secondary battery;
wherein
the secondary battery charging device includes a charging switch that performs a control of determining whether to supply the charging current from the power generation device to the secondary battery,
a time management timer portion, in which are pre-set a stop time that is shorter than the charging time and a determination time required for the secondary battery to detect that the charging current from the power generation device is cut off, the time management timer portion counting a second elapsed time starting from a point at which the charging switch becomes conductive and performing a charging stop determination that determines whether the second elapsed time matches the stop time, and also counting a third elapsed time starting from a point at which the charging switch is cut off and performing a charging start determination that determines whether the third elapsed time matches the determination time, and
a charging control portion that causes the charging switch to be conductive or cut off based on results of the charging stop determination and the charging start determination.

2. The secondary battery charging system according to claim 1,
wherein the power generation device is one of a device that utilizes natural energies, including solar power generation that generates electric power by directly converting sunlight energy into electricity using a solar cell and the like, and wind power generation that generates electric power by receiving wind energy with a propeller and causing a rotor to rotate, and a device that uses a fuel cell for power generation.

3. The secondary battery charging system according to claim 1,
wherein
the time management timer portion outputs charging stop information to the charging control portion when the second elapsed time matches the stop time and outputs charging start information to the charging control portion when the third elapsed time matches the determination time, and
the charging control portion cuts off the charging switch based on the charging stop information and causes the charging switch to become conductive based on the charging start information.

4. The secondary battery charging system according to claim 2,
wherein
the time management timer portion outputs charging stop information to the charging control portion when the second elapsed time matches the stop time and outputs charging start information to the charging control portion when the third elapsed time matches the determination time, and
the charging control portion cuts off the charging switch based on the charging stop information and causes the charging switch to become conductive based on the charging start information.

5. The secondary battery charging system according to claim 1,
wherein the stop time and the determination time of the time management timer portion are freely set.

6. The secondary battery charging system according to claim 2,
wherein the stop time and the determination time of the time management timer portion are freely set.

7. The secondary battery charging system according to claim 3,
wherein the stop time and the determination time of the time management timer portion are freely set.

8. The secondary battery charging system according to claim 5,
wherein
the time management timer portion internally has a setting table, in which are set combinations of the stop time and the determination time respectively corresponding to each of a type of the secondary battery, sets the stop time and the determination time in correspondence to the type of the secondary battery to be charged, and uses the stop time and the determination time for the charging stop determination and the charging start determination.

9. A secondary battery charging device that controls an electric current from a power generation device that generates a charging current as a charging power source of a secondary battery, the secondary battery having a protection timer that counts a first elapsed time from a start of charging and is pre-set a charging time, and a function to stop a charging operation when the first elapsed time exceeds the charging time, the secondary battery charging device comprising:
a charging switch that performs a control of determining whether to supply the charging current from the power generation device to the secondary battery;
a time management timer portion, in which are pre-set a stop time that is shorter than the charging time and a determination time required for the secondary battery to detect that the charging current from the power generation device is cut off, the time management timer portion counting a second elapsed time starting from a point at which the charging switch becomes conductive and performing a charging stop determination that determines whether the second elapsed time matches the stop time and also counting a third elapsed time starting from a point at which the charging switch is cut off and performing a charging start determination that determines whether the third elapsed time matches the determination time; and
a charging control portion that causes the charging switch to be conductive or cut off based on results of the charging stop determination and the charging start determination.

* * * * *